United States Patent
Zukerman et al.

(10) Patent No.: US 10,795,026 B2
(45) Date of Patent: Oct. 6, 2020

(54) NAVIGATION SYSTEM AND METHOD

(71) Applicant: Intel IP Corporation, Santa Clara, CA (US)

(72) Inventors: Gil Zukerman, Hod-Hasharon (IL); Ron Rotstein, Tel Aviv (IL); Lior Maor, Petah Tikva (IL)

(73) Assignee: Intel IP Corporation, Santa Clara, CA (US)

( * ) Notice: Subject to any disclaimer, the term of this patent is extended or adjusted under 35 U.S.C. 154(b) by 527 days.

(21) Appl. No.: 14/926,819

(22) Filed: Oct. 29, 2015

(65) Prior Publication Data
US 2017/0123071 A1    May 4, 2017

(51) Int. Cl.
| G01S 19/22 | (2010.01) |
| G01S 19/03 | (2010.01) |
| G01S 19/09 | (2010.01) |
| G01S 19/42 | (2010.01) |

(52) U.S. Cl.
CPC ............. *G01S 19/22* (2013.01); *G01S 19/03* (2013.01); *G01S 19/09* (2013.01); *G01S 19/42* (2013.01)

(58) Field of Classification Search
CPC .......... G01S 19/03; G01S 19/09; G01S 19/22; G01S 19/42; G01S 19/428; G01S 19/46; G01S 19/49
See application file for complete search history.

(56) References Cited

U.S. PATENT DOCUMENTS

| 8,757,477 | B2* | 6/2014 | Do ........................ G01C 21/20 |
| | | | 235/375 |
| 2011/0235687 | A1* | 9/2011 | Mizuochi .............. G01S 19/246 |
| | | | 375/150 |
| 2014/0057649 | A1 | 2/2014 | Han et al. |
| 2016/0349362 | A1* | 12/2016 | Rohr ....................... G01S 13/86 |

FOREIGN PATENT DOCUMENTS

| CN | 101839971 A | 9/2010 |
| CN | 102221701 A | 10/2011 |
| CN | 104122563 A | 10/2014 |
| CN | 104199067 A | 12/2014 |
| CN | 104330788 A | 2/2015 |

OTHER PUBLICATIONS

Office Action dated Jul. 18, 2019 for Chinese Patent Application No. 201610867394.X.
Office Action dated Apr. 14, 2020 for Chinese Patent Application No. 201610867394.X.

* cited by examiner

*Primary Examiner* — Dao L Phan
(74) *Attorney, Agent, or Firm* — Schiff Hardin LLP

(57) ABSTRACT

Described is a navigation solution calculation method and a user device. The method can include providing an assistance request to a server. One or more signal path signatures can be received from the server. The one or more signal path signatures can be associated with a first position of the user device. The one or more signal path signatures can be compared with one or more satellite signals received by the user device from one or more satellites. A second position of the user device can be determined based on the comparison.

20 Claims, 8 Drawing Sheets

NAVIGATION SYSTEM AND METHOD

BACKGROUND

Field

Aspects described herein generally relate to global navigation satellite systems (GNSS), including determining and using multipath signals in determining navigation solutions.

Related Art

A global navigation satellite (GNS) system provides location and time information to receivers on Earth. GNSSs can include the Global Positioning System (GPS), Russia's Global Navigation Satellite System (GLONASS), the European Union's Galileo positioning system (GALILEO), Japan's Quasi-Zenith Satellite System (QZSS), China's Bei-Dou navigation system, and India's Regional Navigational Satellite System (IRNSS) to provide some examples.

GNS systems use radio signals transmitted by orbiting satellites to determine precise ground locations, enabling navigation and location-based services. In operation, a GNS system (GNSS) receiver can determine its position based on the timing of messages received from satellites (e.g., four or more GNSS satellites). The messages specify the time of transmission and the position of the satellite at the time of transmission. The receiver can compute its location using one or more navigation equations and the time of transit for each received message. The location can be displayed (e.g., on an electronic map), or provided to another application.

Assisted GPS ("A-GPS") can be used to reduce the time-to-first-fix. The user equipment, such as a mobile device, can obtain assistance data from, for example, an A-GPS server. Available assistance data can include orbital data for GPS satellites, and can be used to reduce the time required to lock onto signals and decode the data broadcast by the satellites, such as precise time data.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

Figure 1:
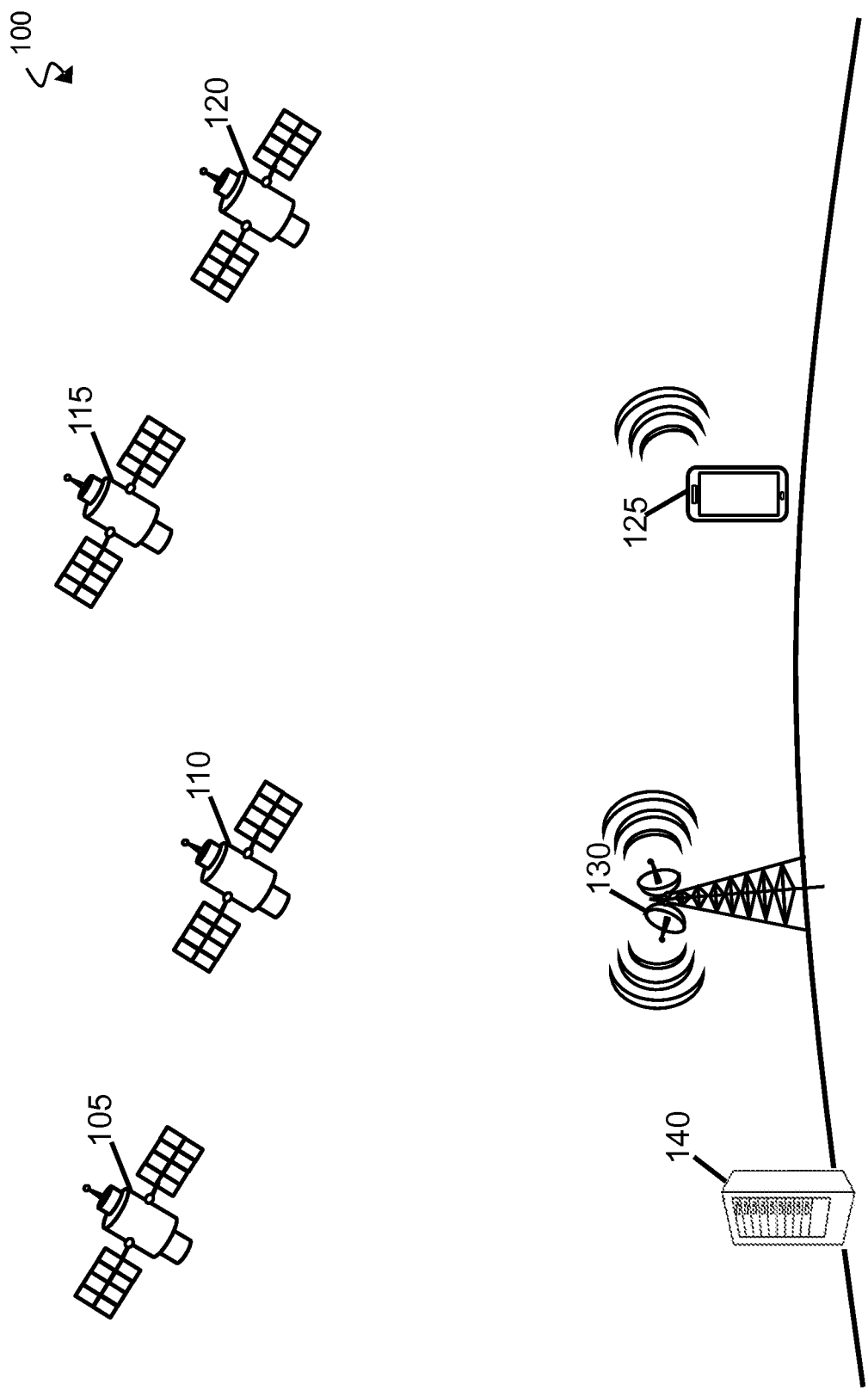
FIG. 1 illustrates a satellite positioning system in accordance with exemplary aspects of the present disclosure.

The exemplary aspects of the present disclosure will be described with reference to the accompanying drawings.

The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In various exemplary aspects of the present disclosure, a GNSS receiver is configured to receive GNSS signals from one or more orbiting satellites. As discussed in more detail below, GNSS signals received from orbiting satellites can be from one or more satellites with a direct line of sight to the GNSS receiver. These GNSS signals can be referred to as "direct GNSS signals" or "direct signals." Alternatively, the GNSS receiver can receive GNSS signals from one or more orbiting satellites not within the direct line of sight of the GNSS receiver that have been reflected and/or refracted by the terrain (e.g., buildings, trees, geography, and/or any other obstructions) before reaching the GNSS receiver. These GNSS signals can be referred to as "reflected GNSS signals" or "reflected signals" because such signals are not received from one or more orbiting satellites within direct line of sight of the GNSS enabled device but are of sufficient magnitude to be utilized in position and navigational determinations. The reflected signals can include a delay and/or can be attenuated as a result of the reflection and/or refraction of the signals as they travel between the satellite(s) and the GNSS receiver. Blocked GNSS signals are GNSS signals that are not received by the GNSS receiver and/or are signals that have been received by the GNSS receiver but are of insufficient magnitude and/or power level to be utilized in position and navigational determinations (e.g., the GNSS signals are completely obstructed or substantially obstructed such that they are of insufficient magnitude and/or power levels to be used in position and navigational determinations).

The GNSS receiver can receive a third type of GNSS signals that include a combination of reflected and direct signals. These GNSS signals can be referred to as "GNSS multipath signals" or "multipath signals." The multipath signals can have multiple reception paths and can be of particular concern as the direct signals may be contaminated by multipath elements that cannot be removed by the receiver, causing uncertainty and measurement errors.

Exemplary Satellite System

FIG. 1 illustrates an exemplary satellite positioning system 100 according to an exemplary aspect of the present disclosure. The satellite positioning system 100 can include one or more user devices 125, one or more positioning satellites (e.g., positioning satellites 105, 110, 115, and 120), a wireless communication tower 130, and an Assisted GPS (A-GPS) server 140.

The user device 125 can include processor circuitry that is configured to determine its location in response to signals from one or more sources, such as positioning satellites 105, 110, 115, and/or 120. The user device 125 can be any electronic device that includes or interfaces with a GNSS receiver and that is configured to determine its location in response to signals from one or more sources as will be apparent to those skilled in the relevant arts without departing from the spirit and scope of the present disclosure. For example, the user device 125 can be a mobile communication device, such as a cellular/smartphone. In some exemplary aspects, the user device 125 can be configured to determine its position with respect to any or all of latitude, longitude, and altitude. In other aspects, one or more other coordinate systems or positional representations can be used in addition to or in place of latitude, longitude, and/or altitude.

The positioning satellites 105, 110, 115, and 120 can be configured to conform with a single positioning system, such as Navstar GPS, Global Navigation Satellite System (GLONASS), and the GALILEO global navigation system. In other exemplary aspects, one or more of the positioning satellites can be associated with a different positioning system than one or more of the other satellites.

The user device 125 is configured to receive signals from positioning satellites (e.g., 105, 110, 115, and/or 120) in the satellite positioning system 100 and to use received signals to determine the position of the user device 125. For example, the user device 125 can estimate its position using measurements of its range from a number of the positioning satellites, and to extract broadcast ephemeris data from the received signals. The ephemeris data can include navigational information of the positioning satellites, such as satellite orbit models, clock models, and/or information about the operational status of the positioning satellites. In operation, the navigational information can be utilized in determining, for example, a position fix and/or the velocity of the user device 125. Typically, the broadcast ephemeris is valid for a limited period of time (e.g., two to four hours from the time of broadcast). Before the end of the validity period, the user device 125 can obtain a fresh broadcast ephemeris to continue positional determinations. The range between the user device 125 and the transmitting positioning satellite can be measured based on the time it takes the message to travel from the positioning satellite to the user device 125.

The user device 125 can be configured to communicate with one or more servers (e.g., A-GPS server 140) utilizing one or more communication standards or protocols as would be understood by those of ordinary skill in the art. The user device 125 can also be configured to communicate with one or more communication towers 130 to obtain information to assist in positional determinations. The communication tower 130 can be, for example, a cellular tower of a cellular network, a wireless local area network (WLAN) access point, etc.

The communication tower 130 can transmit assistance data to user device 125, including the current time, the position of one or more satellites, clock offset data for the one or more satellites, and/or an estimate of the location of user device 125 based on, for example, the location of one or more of the wireless communication towers 130. In some other implementations, the communication tower 130 can estimate the position of the user device 125, either alone or in combination with one or more other communication towers 130 using, for example, signal strength observations or time-of-flight and/or angle-of-arrival calculations using signals transmitted by the user device 125.

Exemplary Assisted GPS Server

Figure 2A:
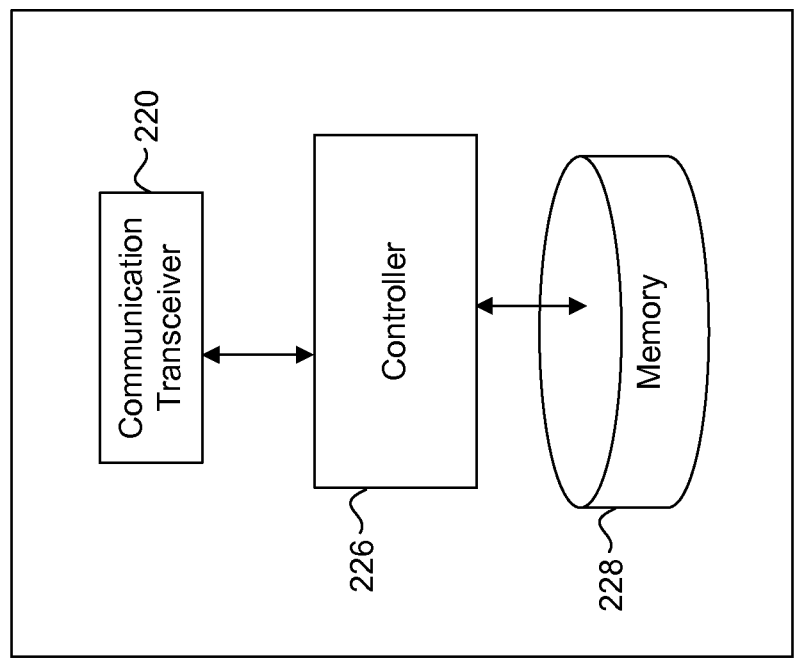
FIG. 2A illustrate a block diagram of an exemplary an assisted GPS server in accordance with exemplary aspects of the present disclosure.

In an exemplary aspect, the user device 125 can communicate with an A-GPS server 140 to reduce the time required to determine a position and/or to reduce the amount of processing required to be performed by the user device 125. An exemplary aspect of the A-GPS server 140 is illustrated in FIG. 2A.

A-GPS server 140 can include memory 228 that stores information associated with positioning satellites (e.g., orbital information), which can be downloaded by the user device 125. Further, the A-GPS server 140 can include a communication transceiver 220 configured to communicate with the user device 125 via one or more communication protocols (e.g., WLAN, LTE, etc.). The communication transceiver 220 can include processor circuitry configured to transmit and/or receive wireless communications via one or more communication protocols. The memory 228 can be any well-known volatile and/or non-volatile memory that stores data and/or instructions. The memory 208 can include, for example, read-only memory (ROM), random access memory (RAM), flash memory, a magnetic storage media, an optical disc, erasable programmable read only memory (EPROM), and programmable read only memory (PROM). The memory 208 can be non-removable, removable, or a combination of both. In an exemplary aspect, the memory 208 can also include processor circuitry.

The user device 125 can use the information provided by the A-GPS server to reduce the time required to determine its location. For example, the user device can determine one or more satellite locations from the A-GPS data, instead of waiting to decode similar data received from satellites. The A-GPS data can assist signal processing algorithms by reducing the search time to obtain a satellite signal.

In some exemplary aspects, the user device 125 can be configured to offload processing to the A-GPS server 140 by uploading information—such as, satellite signal time of arrival information, information on one or more received satellite signals, one or more coarse positions of the user device 125, and/or other information as would be understood by those skilled in the arts—to the A-GPS server 140. The A-GPS server 140 can include a controller 226. The controller 226 can include processor circuitry that is configured to control the overall operation and/or configuration of the server 140, generate a navigation solution, such as a position fix and/or velocity of the user device 125, and provide the navigation solution to the user device 125. In an exemplary aspect, the A-GPS server 140 can be configured to generate one or more multipath signatures/fingerprints corresponding to one or more possible multipath signal paths between the satellite(s) and the user device 125. Each of the multipath signatures/fingerprints can include unique identification information that identifies a corresponding multipath signal path between the user device 125 and one or more satellites, and/or a location where the multipath signal terminates. For the purpose of this discussion, the multipath signatures/fingerprints will be referred to as "multipath signatures."

In operation, the A-GPS server 140 can assist the user device 125 in, for example, urban (or otherwise obstructed environments) and/or indoor environments where traditional satellite-based positioning may fail because of, for example, signals cannot be acquired from a sufficient number of positioning satellites. The A-GPS information is typically accurate for a relatively short duration (e.g., 1-4 hours). In some aspects, long-term orbit (LTO) data can be obtained from a network via the A-GPS server 140. LTO data provides user device 125 with positioning satellite orbit data that is accurate for a longer period of time (e.g., several days).

Exemplary GNSS Enabled User Device

Figure 2B:
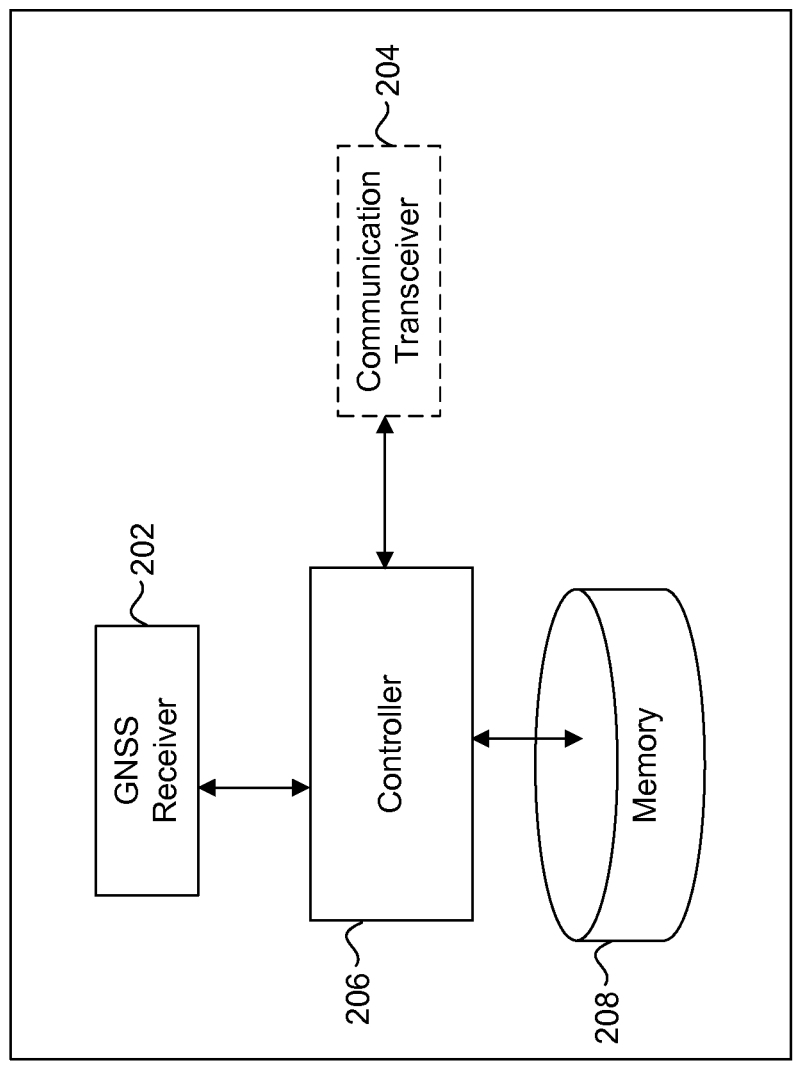
FIG. 2B illustrate a block diagram of an exemplary a GNSS enabled user device in accordance with exemplary aspects of the present disclosure.

FIG. 2B illustrates a schematic diagram of an exemplary user device 125 according to an exemplary aspect of the present disclosure. The user device 125 can be a GNSS enabled user device that is configured to determine the location of the user device 125 in response to signals from one or more sources. For example, the user device 125 can be configured to determine its position from GNSS signals received from one or more positioning satellites (e.g., 105, 110, 115, and 120).

The user device 125 can include a GNSS receiver 202, a controller 206, and a memory 208. In an exemplary aspect, the user device 125 can also include a communication transceiver 204 that includes processor circuitry that is configured to transmit and/or receive radio signals over one or more communication protocols (e.g., via communication tower 130)

The GNSS receiver 202 can include processor circuitry that is configured to receive GNSS signals from one or more GNSS satellites. The received GNSS signals may include direct signals and/or multipath signals. In an exemplary aspect, the processor circuitry of the GNSS receiver 202 includes one or more transceivers configured to communicate with one or more satellites.

The controller 206 can include processor circuitry that is configured to control overall operation and/or configuration of the user device 125 and to process GNSS signals (including multipath signals) from the GNSS receiver 202 to calculate a navigation solution, such as a position fix and/or velocity of the user device 125.

In exemplary aspects in which the user device 125 includes communication transceiver 204, the controller 206 can be configured to facilitate communication with one or more communication networks and/or with one or more external devices (e.g., server 140). Further, the controller 206 can be configured to process communication signals transmitted/received by the communication transceiver 204 via the communication tower 130 to calculate a navigation solution and/or to assist in the calculation of the navigation solution calculated using the GNSS signals.

The memory 208 can be any well-known volatile and/or non-volatile memory that stores data and/or instructions. The memory 208 can include, for example, read-only memory (ROM), random access memory (RAM), flash memory, a magnetic storage media, an optical disc, erasable programmable read only memory (EPROM), and programmable read only memory (PROM). The memory 208 can be non-removable, removable, or a combination of both. In an exemplary aspect, the memory 208 can also include processor circuitry.

In an exemplary aspect, the user device 125 can be configured to process multipath signals to calculate a navigation solution, such as a position fix and/or velocity of the user device 125. In operation, the controller 206 can be configured to determine a coarse position of the user device 125. The coarse position can be determined based on, for example, one or more signals (e.g., GNSS signals) received from one or more satellites, one or signals received from one or more communication networks (e.g., using communication transceiver 204), historical position data of the user device 125 (e.g., last known position), geographical information, and/or other information as would be understood by those skilled in the relevant arts. The geographical information can include (but is not limited to), for example, ground elevations, information of buildings and/or other manmade structures/formations—such as, information of the location, dimensions, surface reflection coefficient, materials used to form the structure, and/or other information as would be understood by one of ordinary skill in the relevant arts.

The controller 206 can be configured to calculate one or more multipath signatures corresponding to one or more possible multipath signal paths between the satellite(s) and the user device 125. For example, the controller 206 can be configured to calculate one or more possible multipath signal paths between one or more satellites and the location of the user device 125. In an exemplary aspect, the location of the user device 125 can be determined by calculating a coarse position of the user device 125. In this example, the one or more possible multipath signal paths are between the coarse position and the one or more satellites. Based on the calculated multipath paths, the controller 206 can be configured to generate multipath signatures that correspond to one or more of the calculated paths. In an exemplary aspect, the controller 206 can be configured to use one or more ray-tracing techniques for constructing the multipath signals received at the coarse position.

In operation, the controller 206 can be configured to correlate the multipath signature(s) to one or more signals received from one or more satellites. For example, the controller 206 can calculate which one (or more) of the multipath signatures matches or substantially matches a multipath signal received from one or more of the satellites. Based on the correlation (e.g., the matching of the signature), the controller 206 can be configured to determine the position of the user device 125.

In an exemplary aspect, the user device 125 can be configured to provide one or more external devices (e.g., the server 140) with location information for processing of the location information based on one or more multipath signatures. For example, the user device 125 can provide one or more signals and/or signal information received from one or more satellites to the server 140. In some exemplary aspects, the user device 125 can provide a coarse position to the server 140. The coarse position can be based on, for example, historical position data of the user device 125 (e.g., last known position), geographical information (e.g., terrain information), and/or other information as would be understood by those skilled in the relevant arts.

The server 140 can then calculate one or more multipath signatures based on possible multipath signal paths at the coarse position of the user device 125, and correlate the multipath signature(s) with the signal(s) and/or signal information provided by the user device 125 to determine the position of the user device 125. In this example, the processing has been at least partially offloaded to the server 140 from the user device 125. In particular, the server 140 can determine the coarse position of the user device 125 based on the signal and/or signal information provided by the user device 125, generate the multipath signature(s) at the determined coarse position, and correlate the signatures with the signal and/or signal information. The server 140 can determine the position of the user device 125 based on the correlation (e.g., the matching of the signature with the satellite signal). The server 140 can then provide the position to the user device 125.

Exemplary GNSS Receiver

Figure 3:
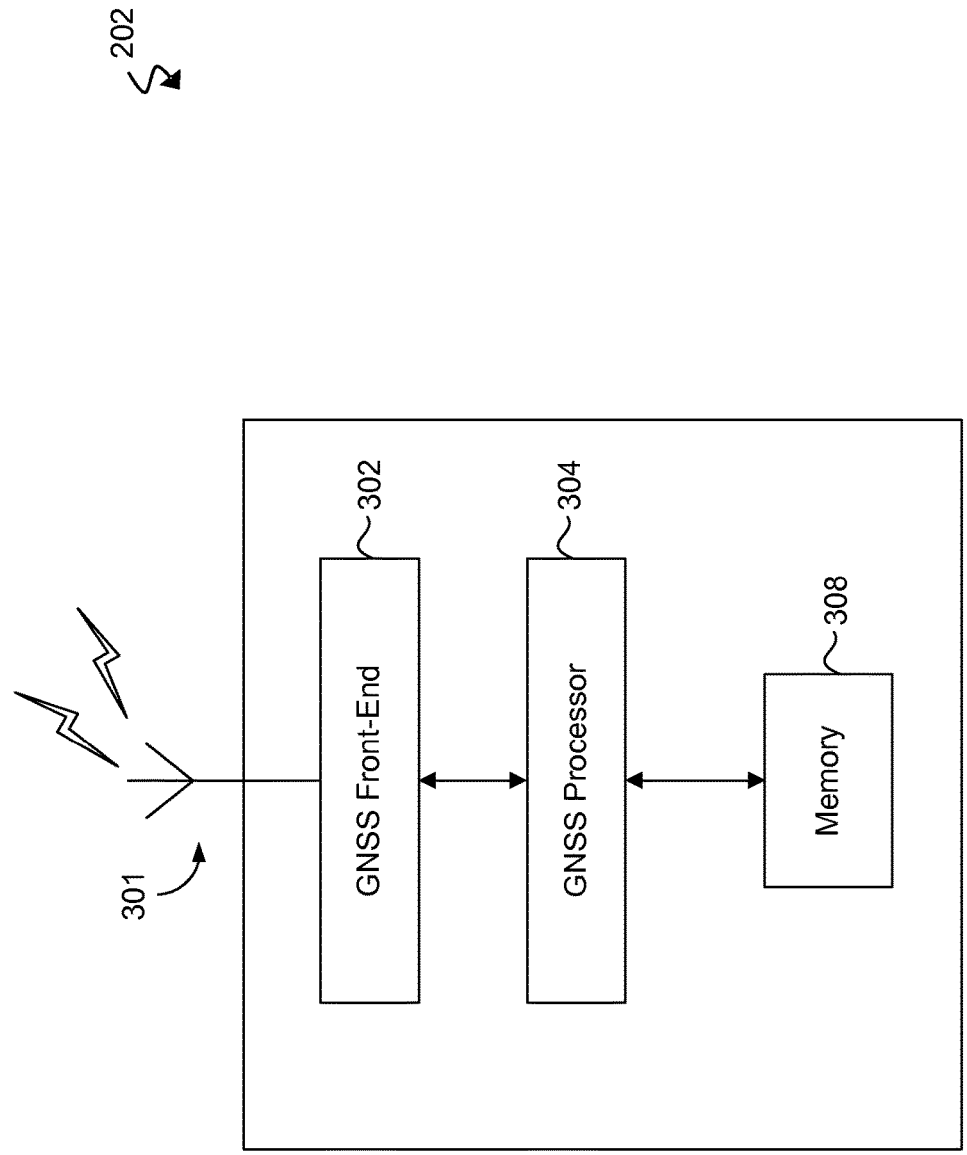
FIG. 3 illustrates a communication platform in accordance with exemplary aspects of the present disclosure.

FIG. 3 illustrates a schematic of the GNSS receiver 202 according to an exemplary aspect of the present disclosure. The GNSS receiver 202 can include a GNSS antenna 301, a GNSS front-end 302, a GNSS processor 304, and a memory 308.

The GNSS antenna 301 can be configured to transmit and/or receive wireless communications signals, including, for example, GNSS signals from one or more satellites. The GNSS antenna 310 can include an integer array of antennas. The GNSS antenna 301 can be configured to communicate received GNSS signals to the GNSS front-end 302 for further processing.

The GNSS front-end 302 can include processor circuitry that is configured to convert the received GNSS signals to GNSS baseband signals, which may be suitable for further processing in the GNSS processor 304 for calculating a navigation solution. Although not shown in FIG. 3, those skilled in the relevant art(s) will understand that the GNSS front-end 302 can be configured to communicate the GNSS baseband signals to the controller 206 (FIG. 2) for further processing by the controller 206 in exemplary aspects in which the controller 206 performs some or all of the processing of received GNSS signals.

The GNSS processor 304 can include processor circuitry that is configured to control overall operation and/or configuration of the GNSS receiver 202 and to process GNSS baseband signals from the GNSS front-end 302 so as to calculate a navigation solution, such as a position fix and/or velocity of the GNSS receiver 202. The GNSS processor 304 can be configured to extract ephemeris comprising satellite navigational information from the GNSS baseband signals. The GNSS processor 304 can also be configured to communicate with the memory 308 to store and/or retrieve calculated navigation solutions, ephemeris, long-term orbits (LTO) data, A-GPS data, and/or GNSS almanac data to/from the memory 308.

Further, the GNSS processor 304 can be configured to identify the positioning satellites from which the received GNSS signals originated based on identification (ID) information associated with the received GNSS signals (e.g., ID information contained within the received signals) and/or the frequencies of the received signals, to provide some examples. In the case of frequency identification, the positioning satellites can transmit at unique frequencies so that each of the positioning satellites may be identified by the frequency of each of the received GNSS signals.

The memory 308 stores information such as executable instructions and/or data that may be utilized by the GNSS processor 304, including satellite navigation information such as ephemeris, clock models, and/or GNSS almanac data. The memory 308 may include read only memory (ROM), random access memory (RAM), magnetic disk storage media, optical storage media, and/or flash memory to provide some examples.

Exemplary Terrain Model

Figure 4A:
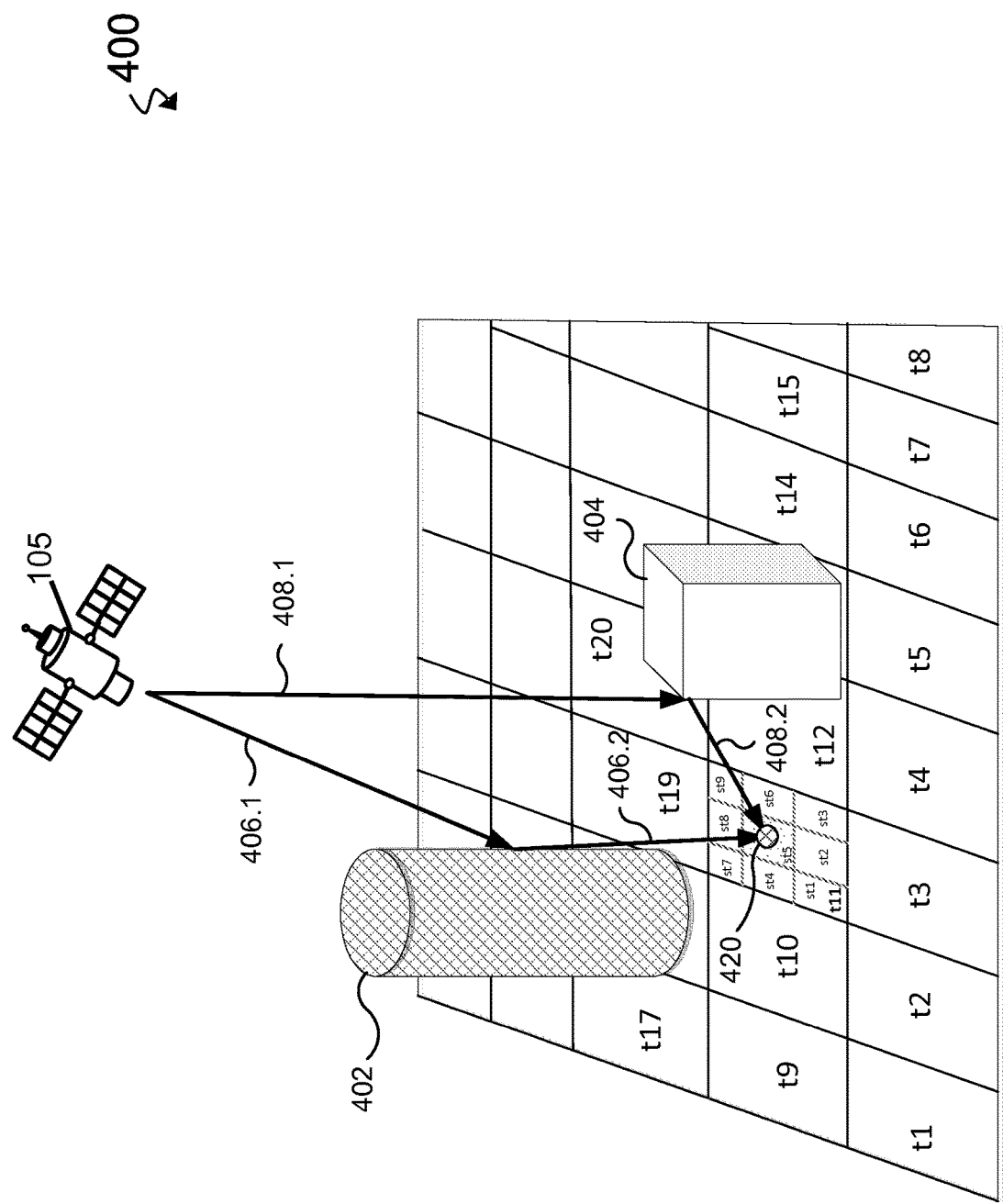
FIGS. 4A-4B illustrate a terrain model in accordance with exemplary aspects of the present disclosure.

FIG. 4A illustrates a perspective view of three-dimensional (3D) terrain model 400 in accordance with exemplary aspect of the present disclosure. The terrain model 400 represents the terrain in proximity to the user device 125. The terrain model 400 includes buildings (or other manmade or natural structures) 402 and 404. The terrain model 400 can be segmented into one or more segments, such as tiles $t_1$ through $t_n$. As illustrated in FIG. 4A, tiles $t_1$ through $t_{20}$ have been identified, where building 402 is located in tile $t_{19}$ and building 404 is located in tile $t_{13}$. The number of tiles within the terrain model 400 is not limited to 20 tiles, and can be any number of tiles based on the size of the terrain model and the dimensions allocated for each segment. In an exemplary aspect, the tiles can be, for example, 150 m by 150 m, but are not limited to these dimensions.

Figure 4B:
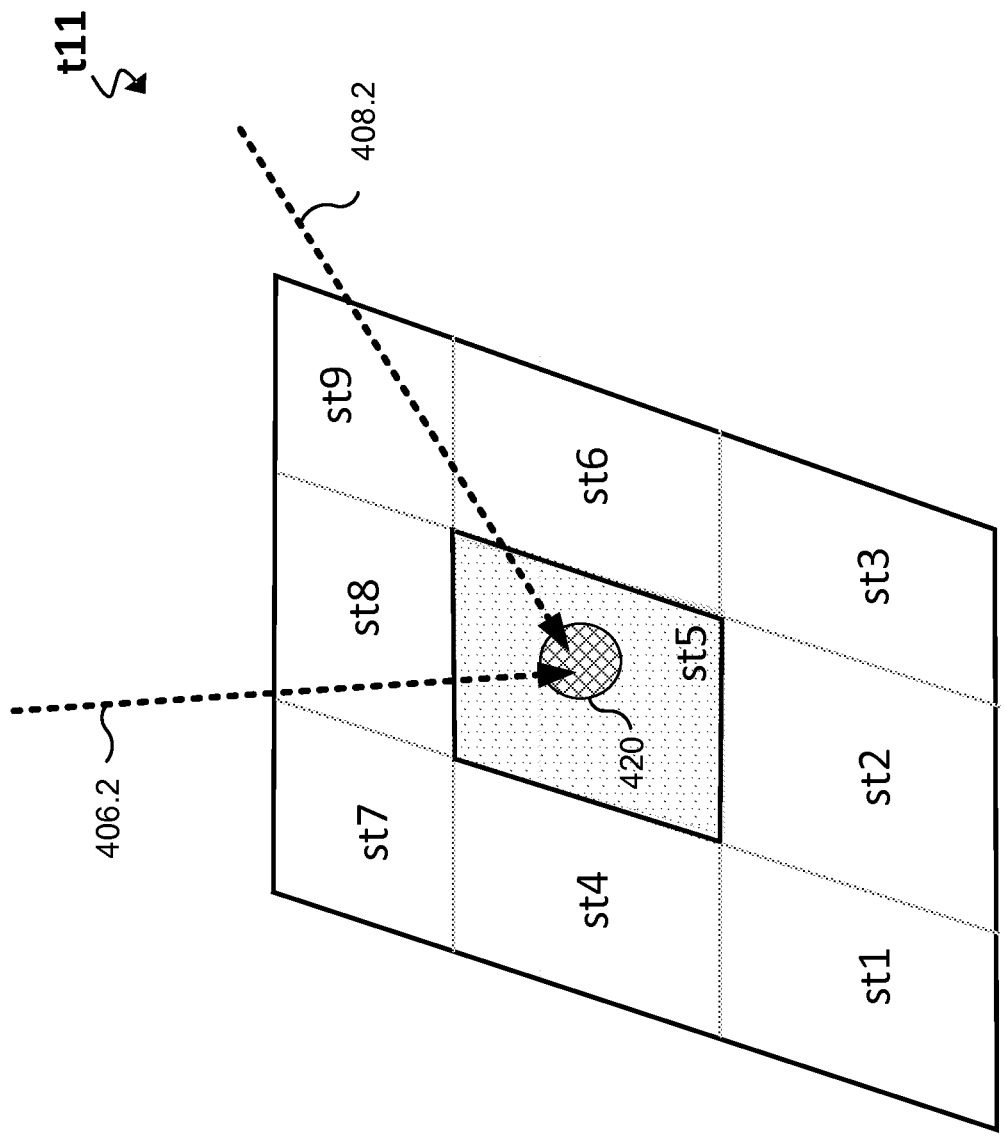

The tiles can be further divided into sub-segments, such as sub-segments $st_1$ through $st_9$ as illustrated in tile $t_{11}$. In this example, the dimensions of the sub-segments are 50 m by 50 m, but are not limited to these dimensions. As larger illustration of tile $t_{11}$ and the sub-segments $st_1$ through $st_9$ are illustrated in FIG. 4B.

In an exemplary aspect, the position of the user device 125 can be determined, such as the coarse position of the user device 125, as indicated by reference character 420. In this example, the user device 125 is located at 420 within sub-segment tile $st_5$ of tile $t_{11}$. At this location, the user device 125 can receive one or more multipath signals 406 and 408 from satellite 105. The signal 406 is a multipath signal and includes a first portion 406.1 and a second portion 406.2. The first portion of the signal 406.1 is reflected and/or refracted by building 402 resulting in the second portion of the signal 406.2 arriving at the user device 125. Similarly, the signal 408 is a multipath signal and includes a first portion 408.1 and a second portion 408.2. The first portion of the signal 408.1 is reflected and/or refracted by building 404 resulting in the second portion of the signal 408.2 arriving at the user device 125.

As discussed above, the user device 125 can be configured to calculate a navigation solution, such as a position fix and/or velocity of the user device 125, based on one or more multipath signals and one or more multipath signatures. For example, the controller 206 can be configured to determine a coarse position of the user device 125. The coarse position can be determined based on, for example, one or more signals (e.g., GNSS signals) received from one or more satellites, one or signals received from one or more communication networks (e.g., using communication transceiver 204), historical position data of the user device 125 (e.g., last known position), geographical information, and/or other information as would be understood by those skilled in the relevant arts. In this example, and with reference to FIGS. 4A-4B, the coarse position is determined to be located within in tile $t_{11}$, particularly in sub-segment $st_5$, of the terrain model 400.

The controller 206 can be configured to calculate one or more multipath signatures corresponding to one or more possible multipath signal paths between the satellite(s) and the user device 125 at the determined (coarse) location. For example, the controller 206 can be configured to calculate one or more possible multipath signal paths between satellite 105 and sub-segment $st_5$, and calculate corresponding multipath signatures based on the determined paths.

For example, based on the terrain model 400, the sub-segment $st_5$ can receive, for example, 10 multipath signals, of which multipath signals 406 and 408 are included. The controller 206 can calculate the ten multipath signatures corresponding to these 10 multipath signals.

In this example, the user device 125 actually receives two multipath signals 406 and 408 out of the 10 signals with the sub-segment. To determine the location of the user device 125, the controller 206 can calculate the multipath signatures corresponding to the signals 406 and 408 received by the user deice 125. As would be understood by those skilled in the relevant arts, the number of multipath signals and corresponding multipath signatures are not limited to these exemplary quantities.

In operation, the controller 206 can be configured to correlate (e.g., match) the 10 multipath signatures with the two multipath signatures corresponding to signals 406 and 408. Based on the correlation (e.g., the matching of the signatures), the controller 206 can identify the signals (i.e., signals 406 and 408) that are received by the user device 125. Based on this identification, the controller 206 can estimate the position of the user device 125. For example, the identified signals that are received by the user device 125 have an associated position where they terminate within the sub-segment $st_5$. Using these locations where paths 406 and 408 are terminated, the controller 206 can determine the position of the user device 125 with the sub-segment $st_5$. That is, because these multipath signals 406 and 408 have a corresponding position of termination, and these signals are received by the user device 125, the controller 206 can determine that the user device 125 is at, or substantially close to these positions of termination.

As discussed above, the A-GPS server 140 can assist the user device 125 in determining the position of the user device 125 using one or more multipath signals and corresponding multipath signatures. The determining of the position of the user device 125 with the assistance of the server 140 is discussed in detail below with reference to FIGS. 5 and 6.

Exemplary Navigation Solution Methods

Figure 5:
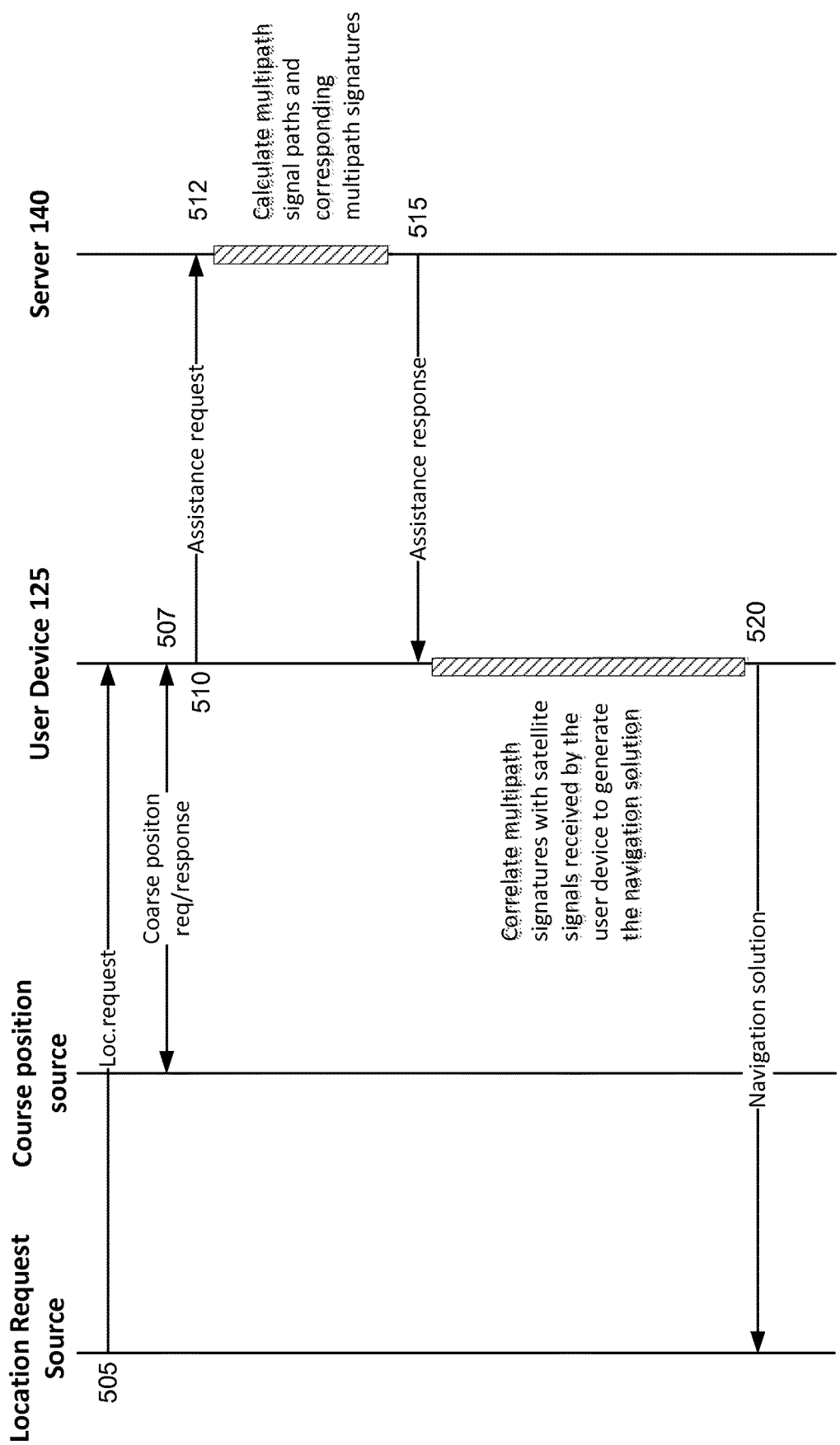
FIG. 5 illustrates a method for calculating a navigation solution according to an exemplary aspect of the present disclosure.

FIG. 5 illustrates a method 500 for calculating a navigation solution according to an exemplary aspect of the present disclosure. In particular, the method 500 illustrates a process for calculating a navigation solution in which the server 140 partially assists in the calculation.

The flowchart is described with continued reference to FIGS. 1-4B. The steps of the method are not limited to the order described below, and the various steps may be performed in a different order. Further, two or more steps of the method may be performed simultaneously with each other.

The method of flowchart 500 begins at step 505, where a location request is received by the user device 125. The location request can be generated by, for example, an operating system of the user device 125, an application running on the user device 125, a user-initiated request, an external device communicating with the user device 125, a service provider supporting the user device 125, an emergency location request (e.g., 911 requested location), and/or another source as would be understood by one of ordinary skill in the relevant arts.

After step 505, the flowchart 500 transitions to step 507, where a coarse position of the user device 125 is determined. In an exemplary aspect, the user device 125 can be configured to calculate the coarse position based on, for example, one or more signals (e.g., GNSS signals) received from one or more satellites, one or signals received from one or more communication networks (e.g., using communication transceiver 204), historical position data of the user device 125 (e.g., last known position), geographical information, and/or other information as would be understood by those skilled in the relevant arts.

In aspects where the coarse position is provided from external sources, or based on information received from external sources, step 507 includes receiving communications from one or more external sources. For example, the user device 125 can receive the one or more GNSS signals from one or more satellites and/or one or signals from one or more communication networks (e.g., via communication tower 130), and calculate the coarse position based on the received communication(s). In some aspects, the receipt of these signals can be in response to one or more coarse position requests generated by the user device 125 and transmitted to these external sources.

After step 507, the flowchart 500 transitions to step 510, where an assistance request is generated and transmitted by the user device 125. For example, the controller 206 can be configured to generate an assistance request and control, for example, the communication transceiver 204 to transmit the generated assistance request to the A-GPS server 140.

In an exemplary aspect, the assistance request can include the coarse position of the user device 125, timing information (e.g., the current time of the user device 125, the time of transmission of the assistance request, and/or the time in which the coarse position was determined), and/or other information as would be understood by those skilled in the relevant arts.

After step 510, the flowchart 500 transitions to step 515, where the A-GPS server 140 receives the assistance request, and generates an assistance response based on the assistance request. In an exemplary aspect, the A-GPS server 140 can use the coarse position and/or timing information included in the assistance request to generate the assistance response. In an exemplary aspect, the A-GPS server 140 can generate the assistance response based on one or more terrain models, ephemeris, clock models, timing information associated with one or more satellites, GNSS almanac data, and/or the assistance request. In an exemplary aspect, the assistance response can include (but is not limited to), for example, one or more multipath signatures, ephemeris, clock models, timing information associated with one or more satellites and/or the A-GPS server 140, information on which satellites are (or may be) visible to the user device at the coarse position, and/or other information as would be understood by one of ordinary skill in the art.

In operation, the A-GPS server 140 can be configured to calculate one or more possible multipath signal paths between the satellite(s) and the coarse position of the user device 125 (e.g., sub-segment $st_5$). In an exemplary aspect, the A-GPS server 140 can be configured to calculate the multipath signal paths based on the coarse position of the user device 125. For example, the A-GPS server 140 can be configured to calculate which possible multipath signal paths from one or more satellites will terminate at (and/or in the proximity of) the coarse position (e.g., within the sub-segment $st_5$). The A-GPS server 140 can be configured to use one or more ray-tracing techniques for constructing the multipath signals received at the coarse position. In one or more exemplary aspects, the A-GPS server 140 can be configured to store predetermined signal paths associated with one or more satellites for one or locations and time periods. In this example, the A-GPS server 140 can retrieve stored signal path results for a given time period at a given location (e.g., at the coarse position) in addition, or as an alternative to calculating the multipath signal paths.

The A-GPS server 140 can then generate multipath signatures that correspond to one or more of the multipath signal paths. Following generation of the multipath signatures, the A-GPS server 140 can transmit one or more assistance responses that include the multipath signatures to the user device 125.

After step 515, the flowchart 500 transitions to step 520, where the user device 125 determines a navigation solution, such as a position fix and/or velocity of the user device 125, based on the assistance response received from the A-GPS server 140. Upon determination of the navigation solution, the user device 125 can provide the navigation solution to the source of the location request received by the user device in step 505.

In an exemplary aspect, the controller 206 can be configured to correlate one or more of the multipath signatures included in the assistance response to GNSS signals received by the user device 125 from one or more satellites. For example, the user device 125 can receive one or more satellite signals (e.g., signals 406 and 408), and the controller 206 can correlate (e.g., match) the satellite signal(s) with corresponding multipath signatures received within the assistance response.

For example, to determine the location of the user device 125, the controller 206 can calculate multipath signatures corresponding to the satellite signals received by the user device 125. The controller 206 can then correlate the calculated multipath signatures with the multipath signatures received within the assistance response to identify the signals (e.g., signals 406 and 408) that are received by the user device 125. Based on this identification, the controller 206 can estimate the position of the user device 125. For example, the identified signals that are received by the user device 125 have an associated position where they terminate. Using these locations, the controller 206 can determine the position of the user device 125.

After step 520, the flowchart 500 ends. In some exemplary aspects, the flowchart can be repeated using the position of the user device determined in step 520 as the coarse position in step 507.

Figure 6:
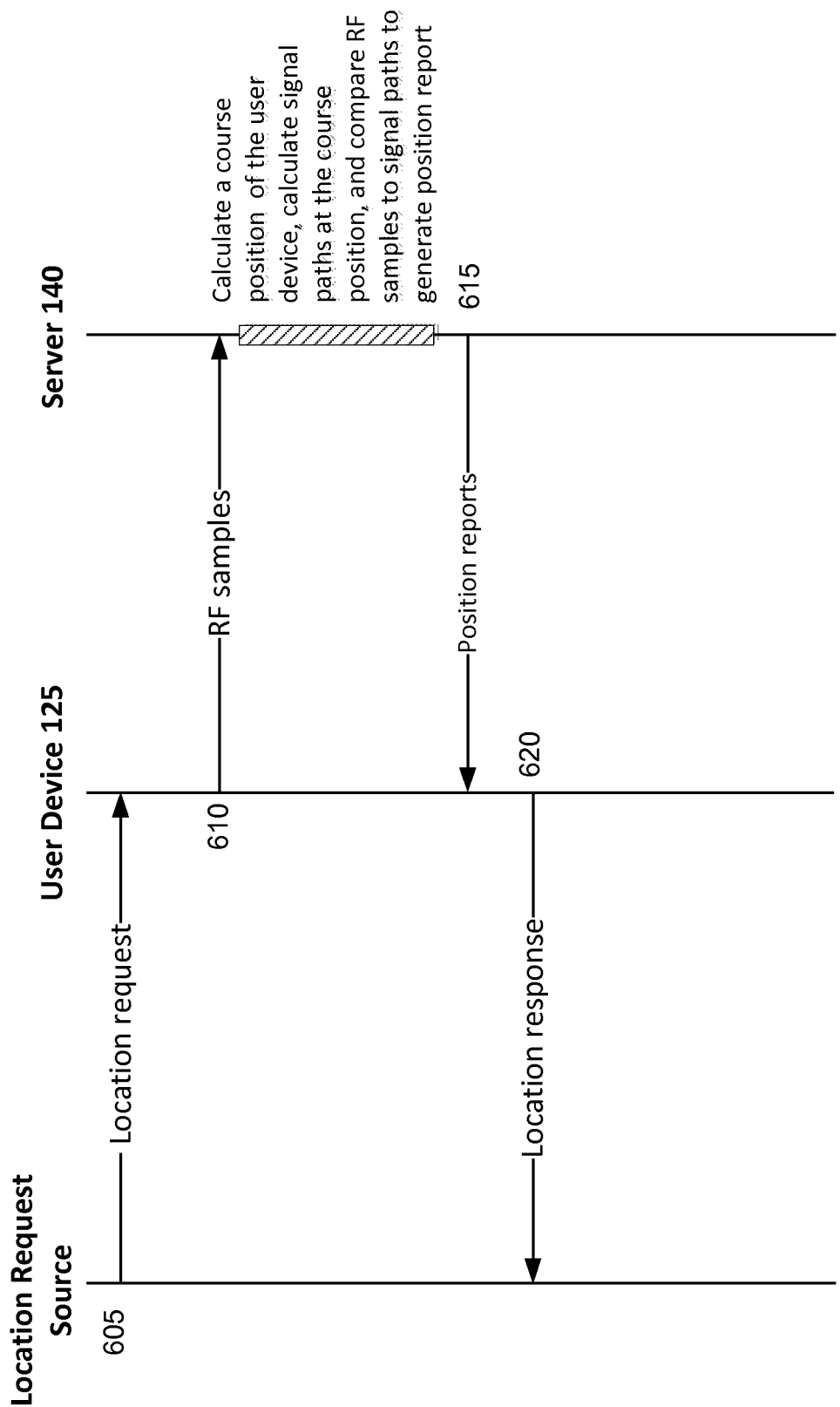
FIG. 6 illustrates a method for calculating a navigation solution according to an exemplary aspect of the present disclosure.

FIG. 6 illustrates a method 600 for calculating a navigation solution according to an exemplary aspect of the present disclosure. In particular, the method 600 illustrates a process for calculating a navigation solution in which the A-GPS server 140 assists in the calculation. In this example, additional processing is offloaded from the user device 125 to the A-GPS server 140 in comparison to the method 500 of FIG. 5.

The flowchart is described with continued reference to FIGS. 1-5. The steps of the method are not limited to the order described below, and the various steps may be performed in a different order. Further, two or more steps of the method may be performed simultaneously with each other.

The method of flowchart 600 begins at step 605, where a location request is received by the user device 125. The location request can be generated by, for example, an operating system of the user device 125, an application running on the user device 125, a user-initiated request, an external device communicating with the user device 125, a service provider supporting the user device 125, an emergency location request (e.g., 911 requested location), and/or another source as would be understood by one of ordinary skill in the relevant arts.

After step 605, the flowchart 600 transitions to step 610, where the user device 125 can determine one or more GNSS signals (e.g., RF samples) that have been received by the user device 125 from one or more satellites. The user device 125 can be configured to transmit the GNSS signal(s) to the A-GPS server 140 using, for example, the communication transceiver 204.

After step 610, the flowchart 600 transitions to step 615, where A-GPS 140 generates one or more position reports and transmits the position reports to the user device 125. In an exemplary aspect, a position report can include one or more navigation solutions, such as a position fix and/or velocity of the user device 125. In an exemplary aspect the position report can include (but is not limited to), for example, one or more navigation solutions, one or more multipath signatures, ephemeris, clock models, timing information associated with one or more satellites and/or the A-GPS server 140, information on which satellites are (or may be) visible to the user device at the coarse position, and/or other information as would be understood by one of ordinary skill in the art.

In an exemplary aspect, the A-GPS 140 can determine a coarse position of the user device 125 based on, for example, one or more satellite signals received from one or more satellites by the user device 125 and provided to the A-GPS 140 in step 610. In some aspects, the coarse position of the user device can be calculated based on (in addition or as an alternative to the satellite signals) one or signals received from one or more communication networks (e.g., using communication transceiver 204), historical position data of the user device 125 (e.g., last known position), geographical information (e.g., one or more terrain models), ephemeris, clock models, timing information associated with one or more satellites, GNSS almanac data, and/or other information as would be understood by those skilled in the relevant arts.

In operation, the A-GPS server 140 can be configured to calculate one or more possible multipath signal paths between the satellite(s) and the coarse position of the user device 125 (e.g., sub-segment $st_5$). In an exemplary aspect, the A-GPS server 140 can be configured to calculate the multipath signal paths based on the coarse position of the user device 125. For example, the A-GPS server 140 can be configured to calculate which possible multipath signal paths from one or more satellites will terminate at (and/or in the proximity of) the coarse position (e.g., within the sub-segment $st_5$). The A-GPS server 140 can be configured to use one or more ray-tracing techniques for constructing the multipath signals received at the coarse position. In one or more exemplary aspects, the A-GPS server 140 can be configured to store predetermined signal paths associated with one or more satellites for one or locations and time periods. In this example, the A-GPS server 140 can retrieve stored signal path results for a given time period at a given location (e.g., at the coarse position) in addition, or as an alternative to calculating the multipath signal paths.

The A-GPS server 140 can then generate multipath signatures that correspond to one or more of the multipath signal paths at the coarse position of the user device 125 and multipath signatures based on the satellite signals received by the user device 125 and provided to the A-GPS server in step 610. The A-GPS server 140 can compare (e.g., correlate) the coarse position multipath signatures with the satellite signal multipath signatures to identify the signals satellite signals received by the user device 125.

Based on this identification, the A-GPS server 140 can estimate the position of the user device 125. For example, the identified signals that are received by the user device 125 have an associated position where they terminate. Using these locations, the A-GPS server 140 can determine the navigation solution (e.g., the location of the user device 125). Upon determination of the navigation solution, the A-GPS server 140 can provide the navigation solution to the user device 125.

After step 615, the flowchart 600 transitions to step 620, where the user device 125 can provide the navigation solution to the source of the location request received by the user device in step 605. In an exemplary aspect, the user device 125 can also use the navigation solution for one or more operations of the user device 125 as would be understood by those skilled in the art.

After step 620, the flowchart 600 ends. In some exemplary aspects, the flowchart can be repeated using the position of the user device determined in step 620 as the coarse position determined in step 615.

Examples

Example 1 is a solution calculation method in a user device, the method comprising: sending an assistance request to a server; receiving one or more signal path signatures associated with a first position of the user device from the server; comparing the one or more signal path signatures with one or more satellite signals received from one or more satellites; and calculating a second position of the user device based on the comparison.

In Example 2, the subject matter of Example 1, further comprising: generating the assistance request based on the first position.

In Example 3, the subject matter of Example 1, further comprising: calculating the first position of the user device.

In Example 4, the subject matter of Example 1, wherein the one or more signal path signatures are generated based on one or more signal paths associated with the first position of the user device.

In Example 5, the subject matter of Example 4, wherein the one or more signal paths are signal paths between the one or more satellites and the first position.

In Example 6, the subject matter of Example 4, wherein the one or more signal paths are multipath signal paths.

In Example 7, the subject matter of Example 1, wherein the second position is more accurate than the first position.

Example 8 is a navigation solution calculation method, comprising: receiving signal information from a user device, the signal information corresponding to one or more satellite signals received by the user device from one or more satellites; calculating a first position of the user device based on the signal information; calculating one or more signal paths associated with the first position of the user device; and calculating a second position of the user device based on the signal information and the one or more signal paths.

In Example 9, the subject matter of Example 8, further comprising: calculating one or more first signal path signatures corresponding to the one or more signal paths, wherein the calculating the second position is further based on the one or more first signal path signatures.

In Example 10, the subject matter of Example 9, further comprising: calculating one or more second signal path signatures based on the signal information, wherein the calculating the second position is further based on the one or more second signal paths signatures.

In Example 11, the subject matter of Example 10, wherein the calculating the second position further comprises: comparing the one or more first signal path signatures and the one or more second signal path signatures.

In Example 12, the subject matter of Example 11, further comprising: identifying the one or more satellite signals received by the user device based on the comparison, wherein the calculating the second position of the user device is further based on the identification of the one or more satellite signals.

In Example 13, the subject matter of Example 8, wherein the one or more signal paths are signal paths between the one or more satellites and the first position.

In Example 14, the subject matter of Example 8, wherein the one or more signal paths are multipath signal paths.

In Example 15, the subject matter of Example 8, wherein the second position is more accurate than the first position.

Example 16 is a user device, comprising: a global navigation satellite system receiver configured to receive one or more satellite signals from one or more satellites; and a controller configured to: compare one or more signal path signatures associated with a first position of the user device and the one or more satellite signals received by the user device; and calculate a second position of the user device based on the comparison.

In Example 17, the subject matter of Example 16, wherein the controller is further configured to: generate an assistance request based on the first position of the user device, wherein the one or more signal path signatures are generated based on the assistance request.

In Example 18, the subject matter of Example 16, wherein the controller is further configured to: calculate the first position of the user device based on the one or more satellite signals received by the user device.

In Example 19, the subject matter of Example 16, wherein the second position is more accurate than the first position.

In Example 20, the subject matter of Example 16, wherein one or more signal path signatures correspond to one or more signal paths associated with the first position of the user device.

In Example 21, the subject matter of Example 20, wherein the one or more signal paths are multipath signal paths.

In Example 22, the subject matter of any of Examples 1-2, further comprising:

calculating the first position of the user device.

In Example 23, the subject matter of any of Examples 1-3, wherein the one or more signal path signatures are generated based on one or more signal paths associated with the first position of the user device.

In Example 24, the subject matter of Example 23, wherein the one or more signal paths are signal paths between the one or more satellites and the first position.

In Example 25, the subject matter of Example 23, wherein the one or more signal paths are multipath signal paths.

In Example 26, the subject matter of any of Examples 1-6, wherein the second position is more accurate than the first position.

Example 27 is an apparatus comprising means to perform the method as claimed in any of claims 1-15.

Example 28 is a computer program product embodied on a computer-readable medium comprising program instructions, when executed, causes a machine to perform the method of any of claims 1-15.

Example 29 is an apparatus substantially as shown and described.

Example 30 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Examples of user devices, user equipment, and/or mobile devices can include (but are not limited to) a mobile computing device—such as a laptop computer, a tablet computer, a mobile telephone or smartphone, a "phablet," a personal digital assistant (PDA), navigation device (e.g., GPS receiver) and the like; and a wearable computing device—such as a computerized wrist watch or "smart" watch, computerized eyeglasses, and the like. In some aspects, the user/mobile device may be a stationary, including, for example, a stationary computing device—such as a personal computer (PC), a desktop computer, a computerized kiosk, an automotive/aeronautical/maritime in-dash computer terminal, automotive/aeronautical/maritime in-dash navigation systems, etc.

One or more of the exemplary aspects described herein can be implemented using one or more wireless communications conforming to one or more communication standards/protocols, including (but not limited to), Long-Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and/or Worldwide Interoperability for Microwave Access (WiMAX) (IEEE 802.16), to one or more non-cellular communication standards, including (but not limited to) WLAN (IEEE 802.11), Bluetooth, Near-field Communication (NFC) (ISO/IEC 18092), ZigBee (IEEE 802.15.4), Radio-frequency identification (RFID), and/or to one or more well-known navigational system protocols, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. These various standards and/or protocols are each incorporated herein by reference in their entirety.

What is claimed is:

1. A navigation solution calculation method in a user device, the method comprising:
   sending an assistance request to a server;
   receiving one or more signal path signatures associated with a first position of the user device from the server and generated based on one or more satellite signal paths between one or more satellites and the first position of the user device;
   comparing the one or more signal path signatures with one or more satellite signals received from one or more satellites; and
   calculating a second position of the user device based on the comparison.

2. The method of claim 1, further comprising: generating the assistance request based on the first position.

3. The method of claim 1, further comprising: calculating the first position of the user device.

4. The method of claim 1, wherein the one or more satellite signal paths are multipath signal paths.

5. The method of claim 1, wherein the second position is more accurate than the first position.

6. A navigation solution calculation method, comprising:
   receiving signal information from a user device, the signal information corresponding to one or more satellite signals received by the user device from one or more satellites;
   calculating a first position of the user device based on the signal information;
   calculating one or more signal paths associated with the first position of the user device;
   calculating one or more first signal path signatures corresponding to the one or more signal paths;
   calculating a second position of the user device based on the signal information, the one or more signal paths, and the one or more first signal path signatures.

7. The method of claim 6, further comprising:
   calculating one or more second signal path signatures based on the signal information, wherein the calculating the second position is further based on the one or more second signal paths signatures.

8. The method of claim 7, wherein the calculating the second position further comprises:
comparing the one or more first signal path signatures and the one or more second signal path signatures.

9. The method of claim 8, further comprising:
identifying the one or more satellite signals received by the user device based on the comparison,
wherein the calculating the second position of the user device is further based on the identification of the one or more satellite signals.

10. The method of claim 6, wherein the one or more signal paths are signal paths between the one or more satellites and the first position.

11. The method of claim 6, wherein the one or more signal paths are multipath signal paths.

12. The method of claim 6, wherein the second position is more accurate than the first position.

13. A user device, comprising:
a global navigation satellite system receiver configured to receive one or more satellite signals from one or more satellites; and
a controller configured to:
generate an assistance request based on a first position of the user device;
compare one or more signal path signatures which are generated based on the assistance request and associated with the first position of the user device, and the one or more satellite signals received by the user device; and
calculate a second position of the user device based on the comparison.

14. The user device of claim 13, wherein the controller is further configured to:
calculate the first position of the user device based on the one or more satellite signals received by the user device.

15. The user device of claim 13, wherein the second position is more accurate than the first position.

16. The user device of claim 13, wherein one or more signal path signatures correspond to one or more signal paths associated with the first position of the user device.

17. The user device of claim 16, wherein the one or more signal paths are multipath signal paths.

18. The method of claim 1, further comprising: generating the assistance request based on the first position, wherein the one or more signal path signatures are generated based on the assistance request.

19. The method of claim 1, wherein the one or more signal path signatures comprise unique identification information that respectively corresponds to the one or more satellite signal paths.

20. The method of claim 19, wherein the unique identification information further corresponds to a location at which the one or more signal paths terminates.

* * * * *